Figure 1:
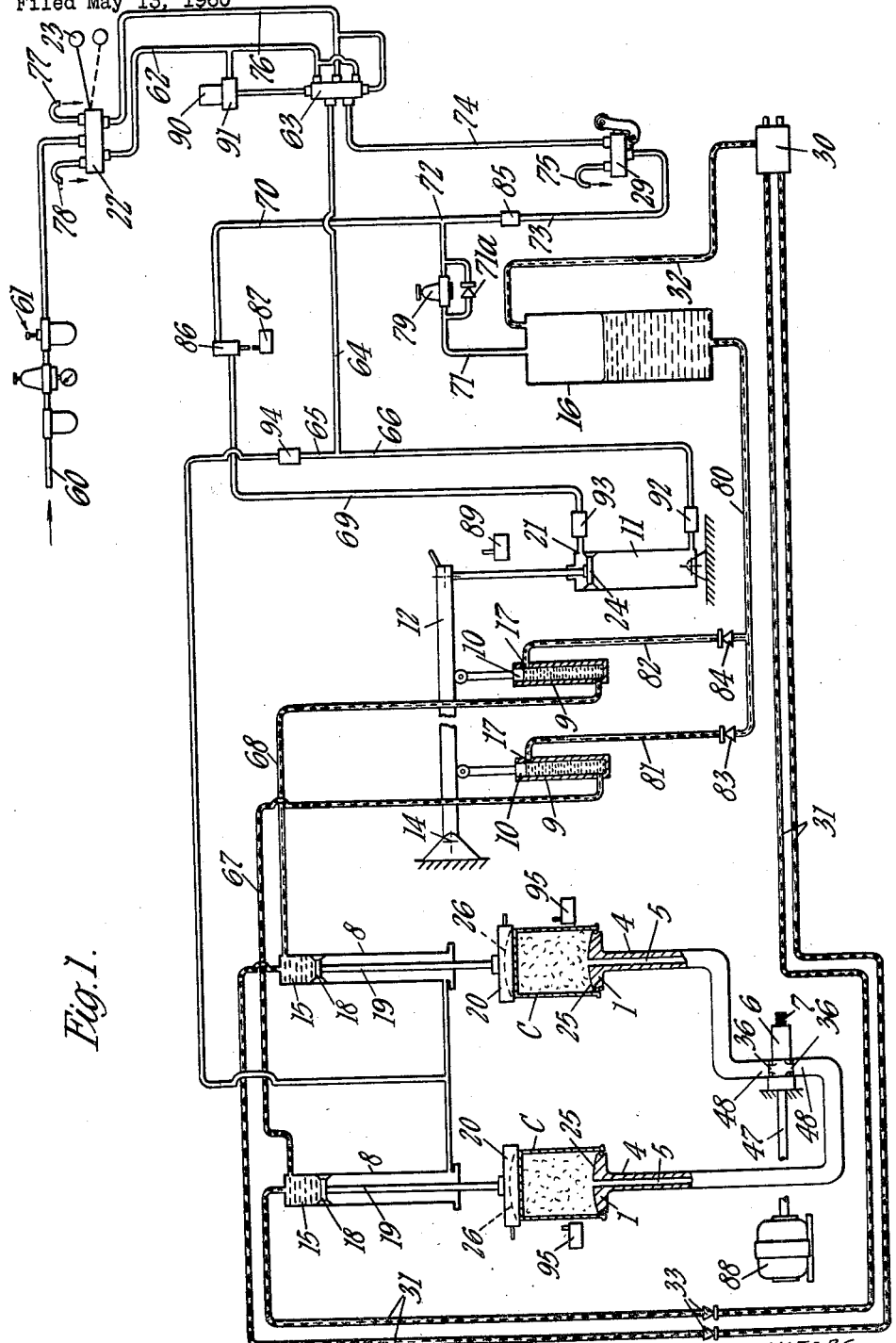

3,071,293
BLENDING AND DISPENSING OF
VISCOUS SUBSTANCES
Charles Peter Lewis-Smith and Herbert Kilduff, Peterborough, England, assignors to Baker Perkins Limited, Peterborough, England
Filed May 13, 1960, Ser. No. 29,004
Claims priority, application Great Britain May 15, 1959
6 Claims. (Cl. 222—135)

This invention relates to apparatus for the blending and dispensing of viscous substances of the type having two or more components which must be kept segregated until the last possible moment before use. A two-component mixture (or two-part system) of this type comprises, for example, a component containing epoxy resin and a component containing an appropriate hardener, which are quick setting after mixing, such mixtures can, for example, be used as fillers in industries where there is extensive use of sheet metal, such as the manufacture of motor car bodies or refrigerator bodies. The blended material replaces lead as a filler for cracks or faults caused by cold working of the sheet metal and the blended material in a paste form is worked into the cracks or faults, usually by means of a plastic palette knife, and then allowed to set hard, the surplus material being removed by grinding prior to the application of the desired final finish.

Because of the highly adhesive properties of this type of material and the general difficulty of handling it, the present apparatus is designed so that the containers in which the component substances are supplied from the manufacturer can be placed direct in the apparatus and the substances fed directly from the containers which in this way provide the material reservoirs of the machine. In view of this it is necessary that the materials are supplied in containers of a specific diameter and constructed so as to have no inside bead or the like at the open end whereby the interior of the container is a plain cylinder having no projecting lips or edges within the internal diameter of the cylinder; further it is desirable that the containers are filled as near as possible to the rim leaving only sufficient space for a lid.

It is an object of the present invention to provide apparatus for blending and dispensing viscous substances of the type indicated in which controlled quantities of the components are delivered from their containers and blended according to the desired predetermined dose of the mixture required to be dispensed, the dose being presettable according to the quantity of the material usable having regard to the job in hand and bearing in mind the quick setting properties of the material once its components have been blended.

It is a further object of the present invention to provide apparatus for blending and dispensing viscous substances of the type indicated in which the proportion of the two or more components blended to form a dose is adjustable.

It is a further object of the present invention to provide apparatus for blending and dispensing viscous substances of the type indicated as set out in the two preceding paragraphs wherein the parts of the apparatus in which the two or more components become blended are easily removable for cleaning and subsequently reattached.

It is a still further object of the present invention to provide apparatus for blending and dispensing viscous substances of the type indicated, as set out in the three preceding paragraphs, wherein in the case of a material which sets rapidly after the blending of its components, the parts of the apparatus in which the two or more components become blended, and hence start their rapid set, are expendable, i.e., replaceable by fresh parts, so that the inevitable clogging of such parts due to the setting of the blended components need not prevent the machine from continuing to operate efficiently.

The invention consists in apparatus for the blending and dispensing of viscous substances of the type indicated, comprising two or more fixed circular piston means having each a feed bore therethrough and feed pipe means leading to a mixing chamber having a dispensing outlet, the diameter of the pistons being such as to co-operate closely with interior walls of cylindrical containers in which the substances to be blended are supplied when the containers are opened so that the containers serve as reservoirs for the substances, displaceable pressure applying means located over each container position, that is, opposite to each of said pistons so as to be movable towards said pistons so that when the containers are placed against said pistons the pressure applying means can be operated to displace the containers relative to the co-operating pistons to cause a feed of the substances from the containers to the mixing chamber and dispensing outlet and actuating means for causing said pressure applying means to apply pressure to the containers to displace each of the latter a predetermined distance, whereby a predetermined dose of the blended substance can be dispensed. The magnitude of the dose can be predetermined by adjusting the distance of displacement of the containers.

The invention further consists in apparatus for the blending and dispensing of viscous substances, as set out in the preceding paragraph, wherein the displaceable pressure applying means comprise a hydraulic container ram associated with each container position and the actuating means therefor comprise a hydraulic metering ram associated with each container ram, means being provided for simultaneously operating the hydraulic metering rams. It is preferred that the container-displacing movements of each of the container rams are adjustable so as to vary the proportions of the components blended and/or the total volume of each dose. Accordingly, the present invention also comprises pivotal lever means moved by a motor device such as a pneumatic cylinder and piston device, which lever means simultaneously operates each of the hydraulic metering rams by contact with their pistons, the position of the hydraulic metering rams relative to one another and relative to the pivot point of said lever means being variable to afford said adjustment of component proportions and dosage.

According to a preferred form of the invention as set out in the preceding paragraphs, the fixed piston means over which the containers are placed are shaped so as to have a domed head and peripheral sealing means, the arrangement being such that when an open container is placed over a piston means, the central highest part of the domed head first makes contact with the container contents and as the container is lowered contact with the contents progresses radially outwardly to exclude air from between the piston head and the interior of the container.

The invention further consists in apparatus for blending and dispensing viscous substances according to the preceding paragraph, wherein the mixing chamber is removable and cleanable.

The invention still further consists in apparatus for the blending and dispensing of viscous substances, according to the penultimate paragraph, wherein the mixing chamber is preferably a removable and expendable unit when the viscous substances being mixed are the components of a rapid setting material.

In the accompanying drawings:
FIGURE 1 is a diagram showing the principal components of a blending and dispensing apparatus, according to the present invention, together with the actuating and control system therefor, FIGURE 2 is a front elevation, partly in section, of the blending and dispensing apparatus, FIGURE 3 is a side elevation, partly in section, and FIGURE 4 is a rear elevation.

In carrying the invention into effect according to one mode by way of example, an apparatus will be described for the blending and dispensing of a quick setting "filler" substance having two component parts of thick cream-like consistency which must be kept separated until immediately before being required for use, such as, for example, epoxy resin-containing component and a component containing an appropriate hardener. It is further assumed that the components are supplied in cylindrical rigid containers having an internal diameter corresponding to that of the co-operating pistons described hereafter and no inwardly projecting lip or edge extending within the internal diameter of the container.

Figure 2:
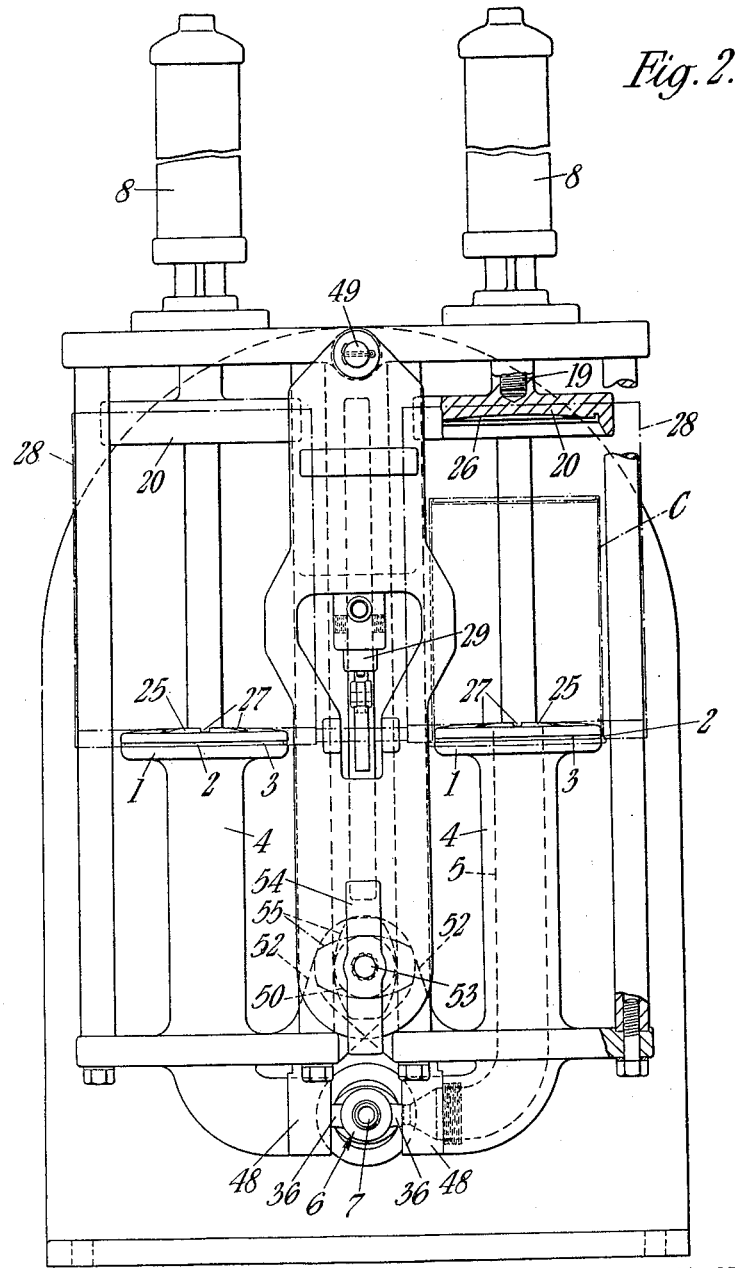
Figure 3:
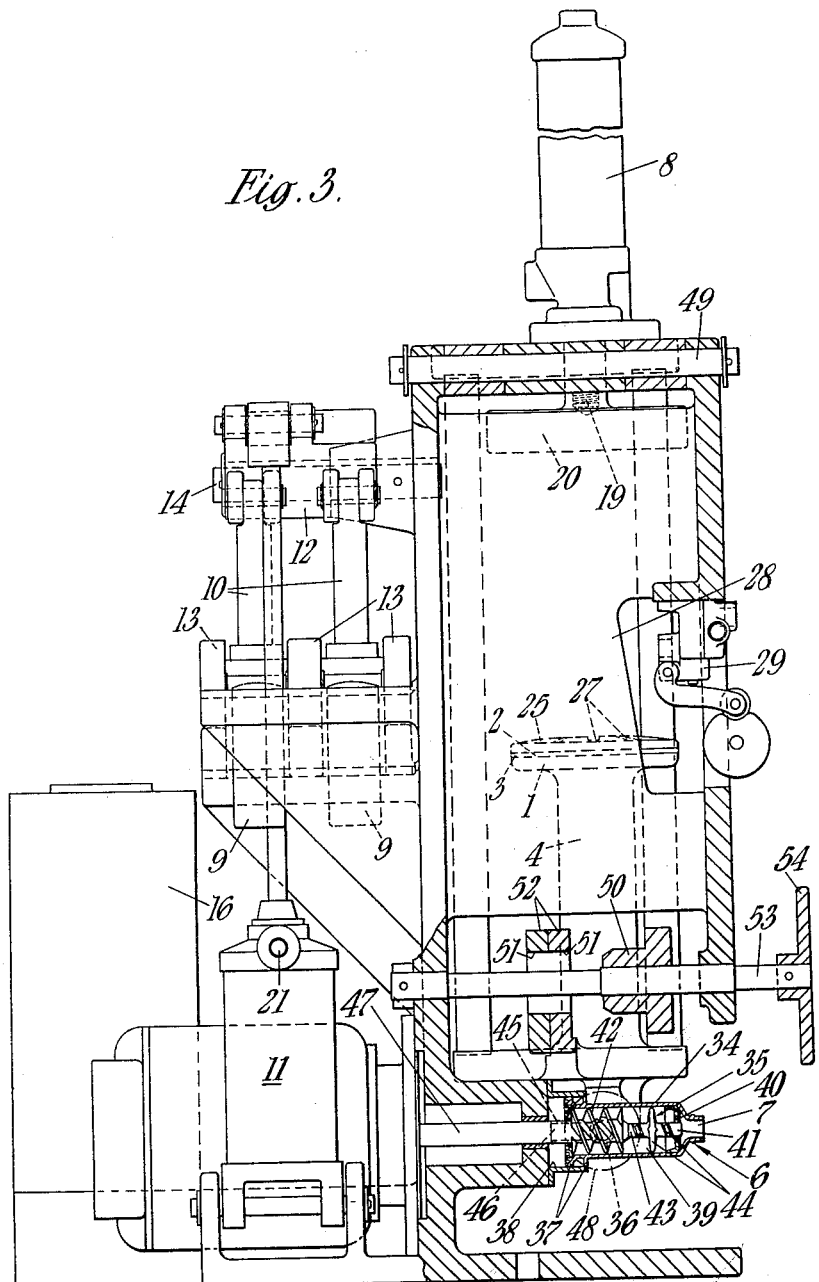
Figure 4:
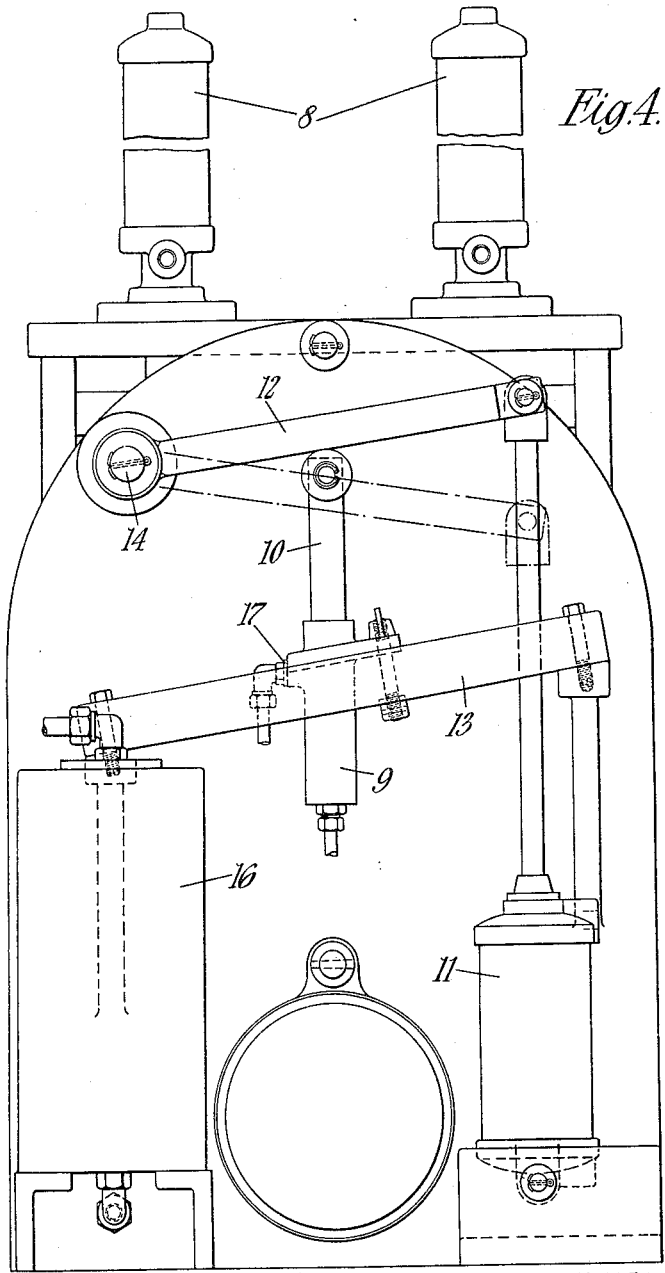

In the drawings, FIGURE 1 shows the main components and the actuating and control system in detail, while FIGURES 2 to 4 show details of the construction of the main components. In the following description, the main components and their basic operation will be described first with reference to FIGURES 1 to 4 and then the actuating and control system will be described in detail with reference to FIGURE 1.

The two containers C, each containing one of the components to be blended are placed in the machine in an inverted position with the mouth of each container over a fixed metal piston 1 which completely fills the bore of the container placed thereon. Each piston 1 is provided around its periphery with a standard type of rubber O-ring 2 fitted in a circumferential groove 3 (FIGURES 2 and 3) in order to obtain a proper sealing between the periphery of the piston and the container wall. Each piston 1 and the central support 4 therefor is formed with an axial feed bore 5 such that as each or either container C is displaced vertically downwards, relative to the piston 1, the contents of the container are forced through the feed bore 5. Since the containers are of a specific diameter, it will follow that if a container is displaced a predetermined axial distance, then a positive predetermined quantity of the contents of that container will be fed through the feed bore 5.

The contents of each container C are forced through the associated piston feed bore 5, which comprises in effect a hollow feed pipe, and are delivered to a special mixing head 6, described hereafter, which is detachably connected to the feed pipe 5 from each container C. In the mixing head 6, the two supplies of components are blended immediately prior to being discharged from a discharge nozzle 7 associated with the mixing head and the mixture so dispensed will be received direct onto, for example, an operator's palette. Where, as in the present instance, the materials being blended and dispensed have highly adhesive properties and are very quick setting, the mixing head 6 may be an expendable item which might have a life expectancy of as little as four to five hours, after which it is discarded and replaced by a new mixing head or can be removed, cleaned and replaced.

The displacement of the containers C on their associated pistons 1 for the purpose of feeding their contents to the mixing head 6 is preferably effected by a hydro-pneumatic system. This system comprises two air/hydraulic cylinders 8 which are hydraulically operated on their positive feed strokes, that is the downward strokes towards the container pistons 1, by two hydraulic rams 9 the pistons 10 of which are adapted to be depressed by a common pneumatic master cylinder device 11. This device operates through a simple pivoted lever 12 with which the rams are always in operative contact and which simultaneously transmits movement of the pneumatic master cylinder device 11 to the pistons 10 of both of the hydraulic rams 9. The two hydraulic rams 9 are mounted on carrying beams 13 (FIGURES 3 and 4) so as to be adjustable along the length of the lever 12 and so vary the distance between the point of effect of the lever 12 thereon and the lever pivot 14. This alters the leverage ratio and thus enables the amount of displacement of each hydraulic ram piston 10 to be varied for a fixed displacement of the common pneumatic master cylinder device 11. The two hydraulic rams 9 are further mounted on the carrying beams 13 so as to be adjustable relative to one another along the length of the lever 12 so that they can be moved along parallel paths and pass each other or be secured side by side if required. By this arrangement the feed from the two containers C can be both proportionately and quantitatively adjusted by the independent and/or simultaneous adjustment of the operation of the hydraulic rams 9 and hence the air/hydraulic cylinders 8 responsible for displacing the containers C relative to their associated fixed pistons 1. In FIGURE 1 the two rams 9 are shown diagrammatically as being at different distances from the lever pivot 14, but in the actual machine (see FIGURE 3) the rams 9 are so mounted that they may be side-by-side or differentially spaced from the lever pivot 14 as required.

The hydraulic side 15 of the two air/hydraulic cylinders 8 which operate on the containers C, and the two hydraulic rams 9, are kept topped up with hydraulic fluid from a combined air/hydraulic fluid reservoir 16 which is pressurised at a controllable preset pressure as described hereafter. The hydraulic fluid is supplied to the hydraulic rams 9 through small side ports 17 in the ram cylinder bodies, regardless of the positions of the ram pistons 10, since the latter have a clearance (not shown) permitting fluid to flow into the ram cylinders even when the ram pistons 10 are below the ports 17, and the hydraulic fluid flows under the fluid reservoir pressure through the supply system, viz. from the air/hydraulic fluid reservoir 16, through the hydraulic rams 9 (the pistons 10 of which will be in a raised position), to the air/hydraulic cylinders 8 to cause the pistons 18 in the air/hydraulic cylinders 8 to move downwardly until they are restrained by their piston rods 19, the thrust caps 20 of which engage the inverted bottoms of the containers C, meeting a resistance which the fluid reservoir pressure is insufficient to overcome, when the pistons 18 will cease to move. The resistance to downward movement is the resistance of the contents of the containers C, which have a sufficiently high viscosity to prevent the fluid reservoir pressure being able to force any of the contents from the containers through their associated feed bores 5.

The apparatus is now primed and in a condition to commence dispensing, so that when the hydraulic ram operating lever 12 is moved by supplying compressed air to its associated pneumatic cylinder 11 through its upper port 21, the pistons 10 of the two hydraulic rams 9 are depressed in unison so that the hydraulic fluid is fed under high pressure, by displacement of the ram pistons 10, to the respective air/hydraulic cylinders 8 above the containers. The pressure created in the hydraulic fluid by the rams 9 and transmitted to the air/hydraulic cylinders 8 is sufficiently high that the above mentioned resistance initially encountered by the air/hydraulic pistons 18 is now overcome and the latter move downwardly a positive distance to displace the containers relative to the pistons 1 therein to cause a predetermined amount of the contents of the containers to be dispensed through the feed pipes 5 to the mixing head 6. The amount of the displacement of the containers C by the air/hydraulic cylinder pistons 18 is therefore accurately controlled since it is dependent only on the length of effective stroke of each ram 9, the bores of the hydraulic rams 9 and the air/hydraulic cylinders 8 being constant.

The two air/hydraulic cylinders 8 are anchored on the apparatus structure and are arranged so that their piston rods 19, which have the previously mentioned thrust cap 20 mounted on the end of each to engage the inverted bottoms of the containers, serve both to locate, and push directly, on the bases of the inverted containers.

It will be appreciated that the quantity of material fed from each container C to the mixing head 6 will depend on the distance of displacement of each of the containers over their associated piston 1 and that the total quantity of material displaced and the proportions of the mixture are governed by the positions of the two hydraulic rams 9 relative to one another and to the pivotal point 14 of the ram operating lever 12. Thus, the proportions of the eventual mixture are controlled by the positioning of the two hydraulic rams 9 relative to one another and the total quantity of material dispensed is controlled by the position of the rams 9 relative to the pivotal point 14 of the ram operaing lever 12.

The air pressure supply serves to operate the pneumatic master cylinder 11 which causes the ram operating lever 12 to be raised and lowered (and also serves to raise the pistons 18 in the air/hydraulic cylinders 8, as described hereafter, when it becomes necessary to discontinue the application of pressure to the two containers C). The air circuit incorporates control valve means 22 (see FIGURE 1 only) which has a manually operable lever 23 enabling the valve to be moved from a normal inoperative position into the operating position. In the normal position of the lever 23, air is admitted to the under sides of the pistons 18 in the air/hydraulic cylinders 8 tending to raise the pistons 18 thereby compressing the hydraulic fluid in the space 15 above the pistons of the air/hydraulic cylinders 8, this pressure being transmitted to the under sides of the hydraulic ram pistons 10 which are thereby maintained in their raised positions; and to the pneumatic master cylinder 11 so that the ram operating lever 12 is in its raised position. When the operating lever is moved to the operative position, air is admitted to the other side of the piston 24 in the pneumatic master cylinder 11 through the port 21 to cause the ram-operating lever 12 to depress the pistons 10 of the two hydraulic rams 9 simultaneously and force hydraulic fluid under high pressure to the air/hydraulic cylinders 8 and so cause them to displace the containers C relative to their associated pistons 1 and dispense a predetermined quantity and proportion of the contents to the mixing head 6 as described above. As mentioned previously, the control system and its operation will be described in greater detail hereafter.

For accurate proportioning of the component materials, it is essential that all air is excluded from the space above the contents of each container C on its insertion into the machine. Materials of the type contemplated for use in this example are of a very thick, creamy, consistency and the containers can be inserted with only a very slow and slight oozing of the cream contents, so that, as mentioned above, full containers have their lids removed and can be turned over to an inverted position prior to being fitted over the fixed pistons 1 in the machine. In order to ensure exclusion of air, the pistons 1 have domed heads 25 and are so shaped that when the containers are being inserted over the pistons 1, the central areas of the pistons, being their highest points, will come into contact with the contents of the containers before the container rims pass the peripheral edges of the pistons 1 as the containers are lowered progressively over the pistons, and the area of contact will increase progressively from the centre areas of the pistons 1 outwardly thus forcing the air to the periphrey so that, as the pistons 1 come completely in contact with the contents of the containers, the container rims pass over the rubber O-rings 2 on the piston circumferences to complete the seal. Thereafter any further movement of the containers C on the pistons 1 will cause the contents of the containers to be forced through the piston bores 5 to the mixing head 6.

Due to this construction of the pistons 1, when the containers have been completely emptied by repeated operation of the machine, the domed piston heads 25 will be pressed up against the bottoms of the containers and will have deformed them to correspond with their domed shape. For this reason the contacting surface 26 of the thrust caps 20 are correspondingly concave. The higher central areas of the domed piston heads 25 will first encounter the centres of the container bottoms and, therefore, to avoid sealing off the feed bores 5 through the pistons 1, radial slots 27 (see FIGURES 2 and 3) are formed in the domed piston heads 25 so as to allow any cream trapped at the periphery of the containers C and pistons 1 to be forced into the centre and thence down through the piston feed bores 5.

For reasons of safety, the containers C, and the thrust caps 20 of the air/hydraulic cylinders 8, which effect their downward displacement, are covered by pivotal guard doors 28 (see FIGURES 2 and 3) with which is associated a cam-operated valve 29 such that when the guard doors 28 are opened the cam-operated valve 29 is actuated to prevent air from the pressure supply being delivered to the air/hydraulic fluid reservoir 16, so the machine cannot operate with the guard doors open. In addition to the cam-operated valve 29 which affects the air supply, there is also provided a fluid valve 30 (see FIGURE 1 only) which opens when the guard doors 28 are opened to permit fluid to flow from the air/hydraulic cylinders 8, through pipes 31, back to the air/hydraulic reservoir 16 through pipe 32, so that the hydraulic pressure backing the pistons 18 of the air/hydraulic cylinders 8 is relieved and the air pressure below the pistons 18 causes them to rise and so lift the thrust caps 20 up from the containers C to the highest position. (The fluid valve 30 also serves as a pressure relief valve, should the pressure in the hydraulic circuit exceed a predetermined maximum.) To prevent the possibility of air from the air/hydraulic reservoir 16 passing through the pipe 32 and pipes 31 to the hydraulic side 15 of the air/hydraulic cylinders 8, non-return valves 33 are inserted in the pipes 31. This action of the fluid valve 30 enables one or both of the containers C to be removed when completely empty, but before this is done, it is necessary to allow entry of air into the container by piercing a hole in its base either manually or automatically, before withdrawal of the thrust caps 20, by means of a spike (not shown) or the like, fixed either to each of the thrust caps 20 or to the top of each fixed piston 1 within the containers.

The mixing head 6 (see particularly FIGURE 3), referred to above, is a unit consisting of a body 34, a mixing and blending impeller 35 and the previously mentioned outlet nozzle 7. The body 34 may conveniently be a flexible high density polythene moulding which has two feed ports 36 (one for each of the two component materials), a bearing surface 37 for locating the mixing head 6 in a locating socket 38 on the machine, and an internal mixing chamber 39 having a single outlet viz. the nozzle 7. The body 34 is also provided with an internal slotted baffle 40 with a central aperture through which the end 41 of the impeller 35 passes; the baffle 40 serves to set up a resistance in to the flow of the mixed material to the nozzle 7, thereby creating a back pressure in the mixing chamber 39 which assists the exclusion of air from the mixture delivered from the nozzle.

The impeller 35 may be either a metal die-casting or a nylon or other moulding and consists of a worm section 42 to compress and carry the material from the feed ports 36 towards the nozzle 7 and a mixing and agitating section 43 comprising a plurality of radially extending blades or vanes 44. The impeller 35 has a central socket 45 adapted to engage the end 46 of a motor driven spindle 47, positive drive being obtained by any suitable means (not shown) such as a pin projecting from the driving spindle and co-operating with short helical grooves or slots formed in the impeller socket.

The two feed ports 36 provided on the mixing head 6 are designed so as to seal with the ends 48 of the feed pipes 4 from the pistons 1 and containers C.

In order to permit the ready insertion and removal of the mixing head 6, the component supply systems, each comprising with the container C, the fixed piston 1 and feed pipe 4 and the air/hydraulic cylinder 8 and thrust cap 20 associated with each container, are mounted as units (see FIGURES 2 and 3) to be pivotal on a shaft 49 near the top of the machine, the two such units being suspended independently but from the same horizontal axis and are arranged so that in their normal operating position they are positively located so as to cause the ends 48 of the feed pipes 4 to be pressed up and sealed against the feed ports 36 in the mixing head 6 as mentioned above. When the ends 48 of the two feed pipes 34 are properly in situ engaging the feed ports 36 on the mixing head 6, the two feed pipes 4 are secured in position, so that they press the mixing head 6 between them to provide sealing pressure on the feed ports 36 of the mixing head 6. Such securement of the feed pipes 4 comprises a common locating spigot 50 which engages in apertures 51 (when aligned) in a pair of overlapping and separate locking lugs 52 associated one each with the feed pipes 4, the spigot 50 being carried on a rod 53 to be axially displaceable into and out of the apertures 51 by means of a locking handle 54. The rod 53 by which the spigot 50 is connected to the locking handle 54 also carries a double eccentric or cam 55 arranged so that on rotation of the rod 53 carrying the spigot 50, after the spigot has been withdrawn from the apertured locking lugs 52, the eccentric or cam 55 engages the mountings of both feed pipes 4 simultaneously and forces them apart so as to pull the ends 48 of the feed pipes 4 from the mixing head ports 36 to permit the mixing head 6 to be removed for replacement or cleaning purposes. After this is done the mixing head 6 may be pulled off, complete, from its locating socket 38 on the machine and from the drive spindle 47.

In order to replace the mixing head 6, its separate components are assembled and it is then placed in the machine so that locating and bearing surface 37 engages its corresponding locating socket 38 on the body of the machine, while at the same time the impeller 35 is engaged with the drive spindle 47. Next by rotating the locking handle 54 back to its original position, the double eccentric or cam 55 is rotated to permit the feed pipes 4 to swing back, together with their associated devices, into position wherein the apertures 51 in their locking lugs 52 are coincident to permit the locating spigot 50 to be inserted by an axial movement of the locking handle 54 and rod 53; at the same time the ends 48 of the feed pipes 4 are pressed on over the feed ports 36 on the mixing head 6. The device is then ready to resume operation.

Considering now in greater detail the actuating and control system as shown, for example, in FIGURE 1, clean lubricated air under pressure is supplied through line 60 via a device, indicated at 61, of known character which cleans, lubricates and governs the pressure of the air.

When the machine is in its normal, non-operating, condition, with the manual lever 23 of the control valve 22 in its raised position, the air pressure is led via line 62, through a reversing valve 63 to be described hereafter, to the line 64 which branches into lines 65 and 66. Line 66 admits air to the underside of the piston 24 of the master cylinder device 11 and raises it to its highest point, thus lifting the lever 12 which is followed by the pistons 10 of the rams 9 due to the hydraulic pressure in the rams 9. Line 65 admits air to the under sides of the pistons 18 of the air/hydraulic cylinders 8 tending to raise them. A comparatively small quantity of hydraulic fluid in the spaces 15 above the pistons 18 can escape from the cylinders 8 along the lines 67 and 68 to the rams 9, the fluid flow being accommodated by the above mentioned raising of the pistons 10 of the rams 9. If the guard doors 28 are open the fluid valve 30 is open permitting the escape of further hydraulic fluid from the spaces 15 above the pistons 18 in the cylinders 8 through the lines 31 and 32 into the reservoir 16, thus permitting the pistons 18 of the air/hydraulic cylinders 8 to rise to their highest point. The tops of the air/hydraulic cylinders 8 are so formed as to ensure that when the pistons 18 are at their highest point a small quantity of fluid is trapped in the top of both of the air/hydraulic cylinders 8 and is kept there under pressure from the upward thrust of the pistons 18 caused by the air pressure below, thus ensuring that the seals on the pistons 18 are maintained distended to avoid leakage of air or fluid past the pistons 18. The top of the master cylinder device 11, above the piston 24 and the top of the air/hydraulic reservoir 16 are open to exhaust, via respectively lines 69 and 70 and through the non-return valve 71a in line 71 which join at 72, the continuing line 73 being in communication with line 74 through the previously described cam-operated valve 29 (which vents line 73 direct to exhaust via port 75 if the guard doors 28 are open), the line 74 connecting in the reversing valve 63, with line 76 which is connected in the control valve 22 to exhaust via port 77.

Under the above conditions, the thrust caps 20 are in their highest raised positions permitting containers C to be placed on, or removed from, the pistons 1 and the hydraulic rams 9 are ready for the next operation.

When the manual lever 23 is depressed (to its dotted position) the air supply line 60 is connected by the control valve 22 to line 76, while line 62 is connected to exhaust via port 78 in the valve 22. The line 76 is connected in the reversing valve 63 with line 74 and thence through the cam-operated valve 29 to apply pressure via line 71 to the air/hydraulic reservoir 16 through a pre-settable pressure regulator 79.

The air pressure on the fluid in the reservoir 16 causes a flow of fluid through the fluid line 80 to two fluid lines 81 and 82 leading each to one of the hydraulic rams 9 through non-return valves 83 and 84. The fluid lines 81 and 82 connect with the upper ports 17 of the rams 9 and thence the fluid pressure is communicated through the fluid lines 67 and 68 leading from the rams 9 to the air/hydraulic cylinders 8, causing the pistons 18 of the latter to press down the thrust caps 20 to engage the bottoms of the containers C inverted over the pistons 1. The pressure, derived from the air pressure in the reservoir 16 and transmitted hydraulically as described to the cylinders 8, continues to depress the thrust caps 20 and the containers C until sufficient displacement of the containers C has taken place to accommodate the internal compressibility of the contents of the containers without causing the contents to flow through the feed bores 5 of the pistons 1. This balance is effected by adjustment of the setting of the pressure regulator 79 in the air supply line 71 to the reservoir 16.

When this initial, "priming," displacement of the thrust caps 20 and containers C is completed and there is no further fluid flow from the reservoir 16, the air pressure in the air lines 73 and 70 builds up. The inclusion of a restrictor 85 in the line 73 causes a pressure drop beyond the restrictor 85 while there is a comparatively large flow of air taking place, but as this lessens and ceases the pressure beyond the restrictor 85 builds up until it reaches a predetermined level which will cause the actuation of a presettable pressure sensitive valve device 86 located in the lines 70 and 69, the effect of which is to cause the air pressure to be transmitted through the upper port 21 of the master cylinder device 11 to the piston 24 which is forced down causing the ram-operating lever 12 to pivot and operrate the rams 9. The effect of the pressure sensitive valve device 86 is therefore to act as a time delay.

When the rams 9 are operated, fluid is forced into the spaces 15 above the pistons 18 of the air/hydraulic cylinders 8, back-flow of the fluid being prevented by the non-return valves 83 and 84 in the hydraulic lines 81 and 82 leading to the rams 9. The thrust caps 20 are therefore forced down and, in turn, force down the containers C over the pistons 1 causing the contents of the container C to flow through the feed bores 5 to the mixing head 6. The quantity of material thus fed from the containers C is dependent on the amount of displacement caused to the containers C by the distance moved by the thrust caps 20 which is dependent on the effective stroke of the piston 10 of each ram 9, adjustable as previously described.

The pressure sensitive device 86 also has associated therewith an electrical switch 87 which is closed as the device 86 is operated to energize the motor 88 driving the blending impeller 35 (see FIGURE 3) of the mixing head 6. Thus the impeller 35 only operates when material is being fed to the mixing chamber.

When the piston 24 of the master cylinder device 11 has completed its full stroke, the lever 12 trips an electrical switch 89 which energises a solenoid 90 which operates a valve 91 to cause the spool (not shown) of the reversing valve 63 to be displaced pneumatically and reverse the air line connection through the reversing valve 63. Thus, even though the manual lever 23 of the control valve 22 is still depressed, the air circuits are changed over so that the air pressure in the line 76 is reconnected to the line 64 from the reversing valve 63 and the "exhaust" line 62 is connected to the line 74 leading from the reversing valve 63, exactly in the way it would have been if the manual lever 23 had been raised to re-actuate the control valve 22.

As a result, air pressure is supplied, via the circuits already described, to the underside of the piston 24 in the master cylinder device 11 and to the undersides of the pistons 18 in the air/hydraulic cylinders 8, while the master cylinder device 11 above its piston 24 and the top of the air/hydraulic reservoir 16 are opened to "exhaust." In consequence, the ram-operating lever 12 is raised as also are the thrust caps 20, which latter move back a distance sufficient only to relieve pressure on the contacts of the containers C so that no further flow takes place. This occurs, since on each operation, additional fluid is pumped by the rams 9 into the air/hydraulic cylinders 8 but cannot normally escape from the hydraulic system, but pressure relief is provided by the lifting of the pistons 10 of the rams 9 when the lever 12 is raised. Thus, the thrust caps 20 move down with the containers C as the latter empty progressively, and only lift a pressure-relieving amount at the end of each operative cycle.

After the reversal of the valve 63 has taken place, the pressure sensitive valve 86 closes and also opens the electrical switch 87 to stop the mixing head motor 88. Thus, the system is reset ready for the next operation by the manual lever 23, which when raised, prior to the next operation, causes a supply of air pressure to pass to the spool of the reversing valve 63 to reset it.

The rate of operation of the master cylinder device 11 is controlled by air flow restrictors 92 and 93 in the lines 66 and 69 which limit the rate of air flow only on leaving the cylinder 11, and impose no restriction on air flowing in the opposite direction. The control of the downstroke of the piston 24 sets the rate at which material is delivered to the mixing head 6 and the control of the upstroke of the piston 24 is imposed to prevent too rapid a rise of the ram-operating lever 12 on its return stroke so that the pistons 10 remain in contact with the lever 12.

A similar one-way air flow restrictor 94 is provided in the air line 65 from the air/hydraulic cylinders 8 so as to limit the rate of discharge of air from below the pistons 18; this ensures adequate air pressure at all times below the pistons to distend the seals on the pistons 18.

When either or both of the containers C are emptied, i.e. are pressed down all the way on the pistons 1, the thrust caps 20 actuate electrical switches 95 which energise the solenoid 90 to cause air valve 91 to reverse the reversing valve 63 with the same result as when the electrical switch 89 is actuated by the ram-operating lever 12 on reaching its lowest position. The pressure of the thrust caps 20 on the containers C is then immediately relieved and when the guard doors 28 (see FIGURE 3) are opened the cam-operated valve 29 and the fluid valve 30 operate as already described to cause the thrust caps 20 to be raised to their highest positions to permit removal of the empty containers and insertion of full containers.

It will be appreciated that the above described control system is only an example of a convenient system for the dispensing and blending apparatus.

We claim:

1. In apparatus for the blending and dispensing of viscous substances of the type indicated, the combination comprising at least two fixed circular piston means having each a feed bore therethrough and feed pipe means leading to a dispensing outlet, the diameter of the pistons being such as to co-operate closely with interior walls of cylindrical containers in which the substances to be blended are supplied when the containers are opened so that the containers serve as reservoirs for the substances, displaceable pressure applying means located over and opposite each container position, means for displacing said pressure applying means towards said pistons so that when the containers are placed against said pistons the pressure applying means can be operated to displace the containers relative to the cooperating pistons to cause a feed of the substances from the containers to the dispensing outlet, independent actuating means for each pressure applying means displacing means simultaneously operable to cause independent pressure-applying displacements of said pressure applying means over independently predeterminable distances which impose the proportions of the components to be mixed and dispensed and means for independently adjusting said actuating means to vary independently the distance over which each pressure-applying means is displaced for each simultaneous operation of said actuating means and thereby to vary the proportions of the components.

2. In apparatus for the blending and dispensing of viscous substances, the combination according to claim 1, wherein the means for displacing the pressure applying means comprise a hydraulic container ram associated with each container position and the actuating means therefor comprise a hydraulic metering ram associated with each container ram, each hydraulic metering ram having cylinder and piston means being provided for simultaneously operating the hydraulic metering rams.

3. In apparatus for the blending and dispensing of viscous substances, the combination according to claim 2, the means for simultaneously operating the hydraulic metering rams comprise pivotal lever means, a motor device for moving said lever means, means on each of the hydraulic metering ram pistons in contact with said lever means, and adjustable mounting means for the hydraulic metering ram cylinders so their positions relative to one another and relative to the pivot point of said lever means may be variable to afford adjustment of component proportions and dosage.

4. In apparatus for the blending and dispensing of viscous substances, the combination according to claim 1, wherein the fixed piston means over which the containers are placed are shaped so as to have a domed head and peripheral sealing means, the arrangement being such that when an open container is placed over a piston means, the central highest part of the domed head first makes contact with the container contents and as the container is lowered contact with the contents progresses radially outwardly to exclude air from between the piston head and the interior of the container.

5. Apparatus for the blending and dispensing of viscous substances, according to claim 3, wherein the actuating and control means for the container rams and for the pneumatic cylinder and piston device for moving the metering ram-actuating lever comprise a pneumatic-hydraulic system including a pressurized air supply and an air/hydraulic reservoir, the pressurised air supply being provided with air lines for displacing the piston of the pneumatic cylinder device to move the ram-operating lever in either direction, for raising the container rams in a direction away from the fixed pistons over which the containers are locatable and for subsequently applying pressure to the hydraulic fluid in the air/hydraulic reservoir in order to cause the container rams to move towards said fixed pistons to apply initial pressure to the contents of the containers against the fixed pistons, the hydraulic lines from the air/hydraulic reservoir having the metering rams in circuit such that, when the ram-operating lever is moved by the pneumatic cylinder device, the metering rams cause hydraulic pressure to be applied to the container rams so that the latter apply additional pressure to the container to cause the contents thereof to flow through the feed bores of the fixed pistons to the dispensing outlet, non-return valves being provided in the hydraulic lines between the air/hydraulic reservoir and the metering rams to prevent the flow of hydraulic fluid back from the metering rams to the reservoir.

6. Apparatus for the blending and dispensing of viscous substances, according to claim 5 wherein, as the components of each dose are dispensed from the containers, the container rams are raised by air from the pneumatic system, only a distance to relieve pressure on the contents of the containers so that they cease to flow, the limitation of the rise of the container rams being imposed by the hydraulic fluid actuating the rams having no space in which to escape, as the rams are raised, other than the limited volume of the metering rams which becomes available as the latter are freed to rise when the ram-actuating lever is raised by the pneumatic cylinder and piston device.

References Cited in the file of this patent
UNITED STATES PATENTS

| | | |
|---|---|---|
| 2,620,173 | White | Dec. 2, 1952 |
| 2,769,576 | Stevens | Nov. 6, 1956 |
| 2,802,648 | Christensen et al. | Aug. 13, 1957 |
| 2,880,455 | Mineah | Apr. 7, 1959 |
| 2,926,619 | Kruder | Mar. 1, 1960 |
| 2,946,488 | Kraft | July 26, 1960 |